Patented May 8, 1934

1,958,110

UNITED STATES PATENT OFFICE 1,958,110

METHOD OF DRYING RUBBER

Edwin B. Newton, Akron, Ohio, assignor to The B. F. Goodrich Company, New York, N. Y., a corporation of New York No Drawing. Application April 23, 1930, Serial No. 446,800

3 Claims. (Cl. 34—24)

This invention relates to the art of rubber manufacturing and particularly to the production of rubber articles directly from latex.

The methods of producing formed rubber articles directly from latex or equivalent aqueous dispersions are quite well known. They include electrodeposition either on metallic forms or on porous forms impregnated with electrolyte, coagulation by diffusion of coagulating ions from the surface of the form into the latex, filtration of the latex serum into or through a porous form leaving a coherent body of the latex solids in the surface, extrusion into a coagulating bath, etc. The product formed by the practice of any of the above methods is, however, not ready for use without further treatment. The product is ordinarily a coherent structure of coagulated rubber, of the general shape and approximate size of the finished article, but containing from about 15% to as high as 75% of water intimately dispersed throughout the mass of the rubber. It is necessary to eliminate substantially all of this water before the rubber attains its characteristic strength and resiliency.

Heretofore the water content of coagulated shaped rubber articles has been eliminated by drying at atmospheric pressure, sometimes following the mechanical expression of a portion of the water. The drying of such articles has been and is a very tedious process, sometimes requiring a week or more to complete, even though the thickness of the rubber be not very great.

I have discovered that articles of coagulated rubber may be dried in a very short time by employing as the drying medium air or other equivalent gas under pressure, preferably also at a high temperature and with a relatively high humidity. The drying may be carried out in any conventional type of pressure vessel, preferably one provided with a jacket or with heating coils through which steam or other heating medium may be circulated. The rubber articles may be placed in the drying vessel on the original mold on which they were coagulated, or they may be stripped from the molds or forms and supported in the dryer on secondary forms or other supporting means. Articles of metal, wood, etc., provided with a permanent coating of rubber are likewise supported in the dryer in a suitable manner so as not to injure or deform the soft coating. The dryer is then closed and air under pressure is admitted and preferably circulated over and around the rubber articles during the drying period.

The pressure of the air greatly reduces, or eliminates entirely all tendency of the soft coagulated rubber to blister or become porous during the drying, for the external pressure overcomes the pressure which may be produced by the expansion of gases or evaporation of liquids entrapped in or under the coagulated rubber or in cavities of the mold. Consequently, the proportion of perfect articles which may be produced is greatly increased, while at the same time the actual drying consumes much less time because of the higher temperatures which are successfully employed.

The details of this invention are subject to numerous modifications, as will be readily understood. The air may be heated prior to its introduction into the dryer, or may be heated only by the heating means provided in the dryer itself. It may be humidified by the introduction of water (preferably in the form of steam) either into the stream of air prior to its introduction into the dryer, or directly into the dryer itself. For example, if the rubber is dried at a temperature of 220° F. the total pressure should be at least 20 or 30 lbs. per square inch above atmospheric pressure to eliminate the possibility of the formation of bubbles or blisters. On the other hand, the humidity of the air should be high enough to prevent the formation of a dry skin on the surface of the rubber before the moisture from the underlying portions is eliminated.

The vapor pressure of water at 220° F. is about 17 pounds per square inch, while at room temperatures it is only about ½ pound per square inch. Consequently, drying may be carried out much more rapidly at the higher temperature, even in air at a relative humidity as high as 90% (corresponding to an actual pressure of water vapor of 15.3 pounds per square inch), for the rate of drying depends on the difference between the vapor pressure of the water contained in the wet rubber, and the actual pressure of the water vapor contained in the drying medium. This difference is more than three times as great at the higher temperatures with a high relative humidity (17−15.3=1.7 pounds per square inch) as at room temperatures in completely dry air (½−0=½ pound per square inch). At lower relative humidity the advantage of the drying at high temperatures under pressure is still greater, and the tendency toward "case-hardening" or surface drying does not ordinarily become very noticeable until the humidity is well below 50%.

For example, rubber articles formed by the coagulation of rubber latex on forms are placed in a steam-jacketed pressure vessel maintained at a temperature of 220° F. The vessel is closed and dry steam is admitted until the pressure is from 8 to 9 pounds per square inch above atmospheric pressure (corresponding to 50% humidity at this temperature). Then preheated air is admitted to bring the total pressure to 80 pounds per square inch. The gases within the vessel are preferably circulated during the drying operation by a fan or other equivalent means. The volume of the vessel is ordinarily large enough so that the water evaporated from the rubber will not unduly increase the humidity of the air, but if desired the humidity may be retained substantially constant by bleeding off a portion of the air and introducing a quantity of dry air sufficient to maintain the pressure. After the rubber is sufficiently dry the gases may be vented to the atmosphere and the dryer opened and the rubber articles removed.

Alternatively, the rubber articles may be vulcanized in the drying chamber by simply increasing the temperature, preferably by the further admission of steam. Thus, the pressure in the chamber, instead of being reduced to that of the atmosphere after the rubber is dry, is still further increased by the admission of steam until a vulcanizing temperature is attained. For example, a temperature of 275° F. is attained by admitting steam until the pressure of the steam alone (exclusive of that of the air) is 45 pounds per square inch. If desired, a part of the air may be bled out of the vessel during the admission of the steam. The vulcanizing temperature is maintained until vulcanization is completed, whereupon the pressure is relieved and the vulcanized articles removed. As a further precaution against blistering, the rubber may be cooled by spraying or flooding with cold water before the pressure is reduced to that of the atmosphere.

It is preferred to dry the rubber at a temperature below that required for vulcanization, in order that a partial vulcanization will not be instituted before the water is eliminated, for it is found that the highest physical properties are attained by vulcanizing the rubber after it is dry, and the latex globules have fully coalesced. However, in some cases the saving in time will outweigh this consideration and the drying and vulcanization will be effected simultaneously at higher temperatures. Articles made of vulcanized latex are likewise advantageously dried by the method of this invention.

The usual advantages attained by the practice of this invention are illustrated by the drying of certain articles containing a rolled bead, which were completely covered with a coating of a vulcanizable rubber composition $\frac{1}{16}$ in. in the thickness, by the coagulation of a latex composition on the articles. When the coatings were dried at atmospheric pressure the time required was from 3 to 4 days and a large proportion of the articles were defective by reason of large blisters due to the expansion of the air contained within the bead. When dried in humidified air at 220° F. and 60 to 80 pounds pressure per square inch as described above the drying was complete in 3 hours and no defective articles were produced.

It is to be understood that the specific methods hereinabove described are only illustrative and that numerous other modifications are possible within the spirit and scope of this invention. It is therefore not intended to limit this invention except as may be required by the prior art and as indicated in the appended claims.

I claim:

1. The method of drying rubber articles derived directly from an aqueous dispersion of rubber, which comprises placing them in a pressure vessel maintained at a temperature above the normal boiling point of water, admitting sufficient steam to saturate partially the air within the vessel, increasing the total pressure to a value at least double the vapor pressure of water at the temperature of the vessel, circulating the gases within the vessel, and relieving the pressure after the rubber is dry.

2. The method of drying rubber articles derived directly from an aqueous dispersion of rubber, which comprises placing them in a pressure vessel maintained at a temperature above the boiling point of water, admitting sufficient steam to saturate partially the air within the vessel, increasing the total pressure to a value well above the vapor pressure of water at the temperature of the vessel, and after the rubber is sufficiently dried, increasing the temperature and vulcanizing the rubber.

3. The method of drying rubber articles derived directly from an aqueous dispersion of rubber which comprises placing them in a pressure vessel maintained at a temperature above the normal boiling point of water, admitting sufficient steam to bring the humidity of the air within the vessel between 50% and 100% saturation, and raising the total pressure to a value at least double the vapor pressure of water at the temperature of the vessel.

EDWIN B. NEWTON.

CERTIFICATE OF CORRECTION.

Patent No. 1,958,110.    May 8, 1934.

EDWIN B. NEWTON.

It is hereby certified that error appears in the printed specification of the above numbered patent requiring correction as follows: Page 1, line 12, for "in" read on; and page 2, line 53, for "usual" read unusual; and that the said Letters Patent should be read with these corrections therein that the same may conform to the record of the case in the Patent Office.

Signed and sealed this 5th day of February, A. D. 1935.

(Seal)

Leslie Frazer
Acting Commissioner of Patents.

at a temperature of 220° F. The vessel is closed and dry steam is admitted until the pressure is from 8 to 9 pounds per square inch above atmospheric pressure (corresponding to 50% humidity at this temperature). Then preheated air is admitted to bring the total pressure to 80 pounds per square inch. The gases within the vessel are preferably circulated during the drying operation by a fan or other equivalent means. The volume of the vessel is ordinarily large enough so that the water evaporated from the rubber will not unduly increase the humidity of the air, but if desired the humidity may be retained substantially constant by bleeding off a portion of the air and introducing a quantity of dry air sufficient to maintain the pressure. After the rubber is sufficiently dry the gases may be vented to the atmosphere and the dryer opened and the rubber articles removed.

Alternatively, the rubber articles may be vulcanized in the drying chamber by simply increasing the temperature, preferably by the further admission of steam. Thus, the pressure in the chamber, instead of being reduced to that of the atmosphere after the rubber is dry, is still further increased by the admission of steam until a vulcanizing temperature is attained. For example, a temperature of 275° F. is attained by admitting steam until the pressure of the steam alone (exclusive of that of the air) is 45 pounds per square inch. If desired, a part of the air may be bled out of the vessel during the admission of the steam. The vulcanizing temperature is maintained until vulcanization is completed, whereupon the pressure is relieved and the vulcanized articles removed. As a further precaution against blistering, the rubber may be cooled by spraying or flooding with cold water before the pressure is reduced to that of the atmosphere.

It is preferred to dry the rubber at a temperature below that required for vulcanization, in order that a partial vulcanization will not be instituted before the water is eliminated, for it is found that the highest physical properties are attained by vulcanizing the rubber after it is dry, and the latex globules have fully coalesced. However, in some cases the saving in time will outweigh this consideration and the drying and vulcanization will be effected simultaneously at higher temperatures. Articles made of vulcanized latex are likewise advantageously dried by the method of this invention.

The usual advantages attained by the practice of this invention are illustrated by the drying of certain articles containing a rolled bead, which were completely covered with a coating of a vulcanizable rubber composition $\frac{1}{16}$ in. in the thickness, by the coagulation of a latex composition on the articles. When the coatings were dried at atmospheric pressure the time required was from 3 to 4 days and a large proportion of the articles were defective by reason of large blisters due to the expansion of the air contained within the bead. When dried in humidified air at 220° F. and 60 to 80 pounds pressure per square inch as described above the drying was complete in 3 hours and no defective articles were produced.

It is to be understood that the specific methods hereinabove described are only illustrative and that numerous other modifications are possible within the spirit and scope of this invention. It is therefore not intended to limit this invention except as may be required by the prior art and as indicated in the appended claims.

I claim:

1. The method of drying rubber articles derived directly from an aqueous dispersion of rubber, which comprises placing them in a pressure vessel maintained at a temperature above the normal boiling point of water, admitting sufficient steam to saturate partially the air within the vessel, increasing the total pressure to a value at least double the vapor pressure of water at the temperature of the vessel, circulating the gases within the vessel, and relieving the pressure after the rubber is dry.

2. The method of drying rubber articles derived directly from an aqueous dispersion of rubber, which comprises placing them in a pressure vessel maintained at a temperature above the boiling point of water, admitting sufficient steam to saturate partially the air within the vessel, increasing the total pressure to a value well above the vapor pressure of water at the temperature of the vessel, and after the rubber is sufficiently dried, increasing the temperature and vulcanizing the rubber.

3. The method of drying rubber articles derived directly from an aqueous dispersion of rubber which comprises placing them in a pressure vessel maintained at a temperature above the normal boiling point of water, admitting sufficient steam to bring the humidity of the air within the vessel between 50% and 100% saturation, and raising the total pressure to a value at least double the vapor pressure of water at the temperature of the vessel.

EDWIN B. NEWTON.

CERTIFICATE OF CORRECTION.

Patent No. 1,958,110.

May 8, 1934.

EDWIN B. NEWTON.

It is hereby certified that error appears in the printed specification of the above numbered patent requiring correction as follows: Page 1, line 12, for "in" read on; and page 2, line 53, for "usual" read unusual; and that the said Letters Patent should be read with these corrections therein that the same may conform to the record of the case in the Patent Office.

Signed and sealed this 5th day of February, A. D. 1935.

(Seal)

Leslie Frazer
Acting Commissioner of Patents.